United States Patent
Lee et al.

(10) Patent No.: US 6,931,637 B2
(45) Date of Patent: Aug. 16, 2005

(54) COMPUTER SYSTEM UPGRADE METHOD EMPLOYING UPGRADE MANAGEMENT UTILITY WHICH PROVIDES UNINTERRUPTED IDLE STATE

(75) Inventors: Aries Lee, Hsinchu (TW); David Ni, Hsinchu (TW); Constance Chu, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 670 days.

(21) Appl. No.: 09/876,445

(22) Filed: Jun. 7, 2001

(65) Prior Publication Data

US 2002/0188933 A1 Dec. 12, 2002

(51) Int. Cl.⁷ .................................. G06F 9/44
(52) U.S. Cl. ............... 717/168; 717/169; 717/170; 717/171; 717/173
(58) Field of Search .................. 717/168, 169, 717/170, 171, 173

(56) References Cited

U.S. PATENT DOCUMENTS

| | | | |
|---|---|---|---|
| 5,313,398 A | * | 5/1994 | Rohrer et al. ............... 703/14 |
| 5,860,012 A | * | 1/1999 | Luu ............................ 717/175 |
| 5,964,874 A | * | 10/1999 | Gross et al. ................. 713/100 |
| 5,966,301 A | | 10/1999 | Cook et al. |
| 6,009,274 A | * | 12/1999 | Fletcher et al. ............. 717/173 |
| 6,113,652 A | | 9/2000 | Lysik et al. |
| 6,138,274 A | * | 10/2000 | Huang et al. ............... 717/168 |
| 6,157,932 A | | 12/2000 | Klein et al. |
| 6,199,203 B1 | * | 3/2001 | Saboff ........................ 717/168 |
| 6,199,204 B1 | * | 3/2001 | Donohue ..................... 717/178 |
| 6,289,510 B1 | * | 9/2001 | Nakajima .................... 717/170 |
| 6,360,363 B1 | * | 3/2002 | Moser et al. ............... 717/170 |
| 6,397,385 B1 | * | 5/2002 | Kravitz ....................... 717/173 |
| 6,668,374 B1 | * | 12/2003 | Sten et al. ................... 717/173 |

* cited by examiner

*Primary Examiner*—Todd Ingberg
*Assistant Examiner*—Qamrun Nahar
(74) *Attorney, Agent, or Firm*—Tung & Associates

(57) ABSTRACT

Within both a method for upgrading a computer system and a system for upgrading the computer system there is provided a computer system having associated therewith an upgrade management utility. The upgrade management utility provides for a buffering of a series of incoming requests to the computer system when upgrading the computer system while operating the computer system, to thus provide an uninterrupted idle state when upgrading the computer system when operating the computer system. Thus, the computer system may be upgraded with minimal disruption of functions which it supports.

10 Claims, 2 Drawing Sheets

COMPUTER SYSTEM UPGRADE METHOD EMPLOYING UPGRADE MANAGEMENT UTILITY WHICH PROVIDES UNINTERRUPTED IDLE STATE

BACKGROUND OF THE INVENTION

1. Field of the Invention

The present invention relates generally to methods for upgrading computer systems. More particularly, the present invention relates to methods for upgrading computer systems when operating computer systems.

2. Description of the Related Art

Microelectronic fabrications, and in particular semiconductor integrated circuit microelectronic fabrications, are generally fabricated while employing complex and intricate multi-step fabrication processes which in turn employ a plurality of microelectronic fabrication process tools which are housed within a microelectronic fabrication facility.

In order to effect fabrication of microelectronic fabrications within microelectronic fabrication facilities, there is generally employed a plurality of computer systems employed for functions including but not limited to microelectronic fabrication tool control functions, microelectronic fabrication routing and work in process (WIP) control functions and microelectronic fabrication raw materials supply and procurement functions.

While computer systems are thus clearly desirable in the art of microelectronic fabrication to assist in efficiently and effectively fabricating microelectronic fabrications, and while computer systems are often essential in the art of microelectronic fabrication for assisting in efficiently and effectively fabricating microelectronic fabrications, computer systems are nonetheless not entirely without problems in the art of microelectronic fabrication when employed for functions directed towards fabrication of microelectronic fabrications. In that regard, it is often difficult in the art of microelectronic fabrication to upgrade computer systems which are employed for purposes directed towards fabrication of microelectronic fabrications, with minimal disruption of the microelectronic fabrication functions which they support.

It is thus desirable in the art of microelectronic fabrication to provide methods, apparatus and systems which allow for upgrading of computer systems within microelectronic fabrication facilities, with minimal disruption to the microelectronic fabrication functions which they support within the microelectronic fabrication facilities.

It is towards the foregoing object that the present invention is directed.

Various methods, apparatus and systems have been disclosed in the arts not necessarily related to microelectronic fabrication arts for upgrading computer systems with minimal disruption to functions which the computer systems support within the arts not necessarily related to the microelectronic fabrication arts.

Included among the methods, apparatus and systems, but not limited among the methods, apparatus and systems are methods, apparatus and systems disclosed within: (1) Cook et al., in U.S. Pat. No. 5,966,301 (an industrial controller apparatus, and method for operation thereof, which comprises a primary programmable controller and a redundant secondary programmable controller, such that when an upgraded version of a program is programmed within and operated from the primary programmable controller, the redundant secondary programmable controller having an un-upgraded version programmed therein serves as a backup for recovery from the upgraded version of the program if the upgraded version of the program proves un-operational); (2) Lysik et al., in U.S. Pat. No. 6,113,652 (a telecommunications apparatus, and method for operation thereof, as employed within a telecommunications network node, wherein the telecommunications apparatus and method for operation thereof provide for receiving in a background location of the telecommunications apparatus an updated software program while operating an un-updated software program in a foreground location of the telecommunications apparatus, and subsequently transferring and operating the upgraded version of the software program in the foreground location of the telecommunications apparatus); and (3) Klein et al., in U.S. Pat. No. 6,157,932 (a computer software product, and method for operation thereof, which provides for updating a redundant transaction service system by removing a first transaction service device from service within the redundant transaction service system, installing new software therein and transferring and converting a database associated with a second transaction service device to the new software within the first transaction service device, prior to returning the first transaction service device to service within the redundant transaction service system).

Desirable in the art of microelectronic fabrication are methods, apparatus and systems which allow for upgrading of computer systems within microelectronic fabrication facilities, with minimal disruption of the microelectronic fabrication functions which they support within the microelectronic fabrication facilities.

It is towards the foregoing object that the present invention is directed.

SUMMARY OF THE INVENTION

A first object of the present invention is to provide a method for upgrading a computer system employed within a microelectronic fabrication facility and a system for upgrading the computer system employed within the microelectronic fabrication facility.

A second object of the present invention is to provide a method and a system in accord with the first object of the present invention, wherein the method and the system provide that the computer system is upgraded while minimally disrupting microelectronic fabrication functions which the computer system supports within the microelectronic fabrication facility.

A third object of the present invention is to provide a method and a system in accord with the first object of the present invention and the second object of the present invention, wherein the method and the system are readily commercially implemented.

In accord with the objects of the present invention, there is provided by the present invention a method for upgrading a computer system and a system for upgrading the computer system.

To practice the method of the present invention, there is first provided a computer system having associated therewith an upgrade management utility, where the upgrade management utility provides for a buffering of a series of incoming requests to the computer system when upgrading the computer system while operating the computer system, to thus provide an uninterrupted idle state when upgrading the computer system when operating the computer system. There is then executed the upgrade management utility when operating the computer system to effect the uninterrupted idle state. There is then upgraded the computer system while in the uninterrupted idle state to provide an upgraded computer system, while simultaneously accumulating a series of buffered incoming requests to the computer system. Finally, there is then terminated the upgrade management utility after upgrading the computer system while in the uninterrupted idle state and released the series of buffered incoming requests for operation within the upgraded computer system.

The method for upgrading the computer system in accord with the present invention contemplates a system employed for upgrading the computer system in accord with the present invention.

The present invention provides a method for upgrading a computer system employed within a microelectronic fabrication facility and a system for upgrading the computer system employed within the microelectronic fabrication facility, wherein the computer system is upgraded while minimally disrupting microelectronic fabrication functions which the computer system supports within the microelectronic fabrication facility.

The present invention realizes the foregoing object by employing within the method for upgrading the computer system and the system for upgrading the computer system an upgrade management utility which provides for a buffering of a series of incoming requests to the computer system when upgrading the computer system while operating the computer system, to thus provide an uninterrupted idle state when upgrading the computer system when operating the computer system.

The method of the present invention and the system of the present invention are readily commercially implemented.

As will be illustrated in greater detail within the context of the Description of the Preferred Embodiment, as set forth below, the present invention may be implemented employing components as are otherwise generally known and generally available within the art of microelectronic fabrication, but employed within the context of specific configuration requirements and specific programming requirements to provide the present invention. Since it is thus at least in part a series of configuration requirements and programming requirements which provides the present invention rather, than the existence of components which provides the present invention, the method of the present invention and the system of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a method for upgrading a computer system employed within a microelectronic fabrication facility and a system for upgrading the computer system employed within the microelectronic fabrication facility, wherein the computer system is upgraded while minimally disrupting microelectronic fabrication functions which the computer system supports within the microelectronic fabrication facility.

The present invention realizes the foregoing object by employing within the method for upgrading the computer system and the system for upgrading the computer system an upgrade management utility which provides for a buffering of a series of incoming requests to the computer system when upgrading the computer system while operating the computer system, to thus provide an uninterrupted idle state when upgrading the computer system when operating the computer system.

Although the present invention and the preferred embodiment of the present invention provide particular value within the context of upgrading a computer system which is employed within a microelectronic fabrication facility, and in particular within a semiconductor integrated circuit microelectronic fabrication facility, the present invention is not in particular so limited. Rather the present invention may be employed for upgrading computer systems employed within facilities including but not limited to chemical fabrication facilities, mechanical fabrication facilities and electrical fabrication facilities.

Figure 1:
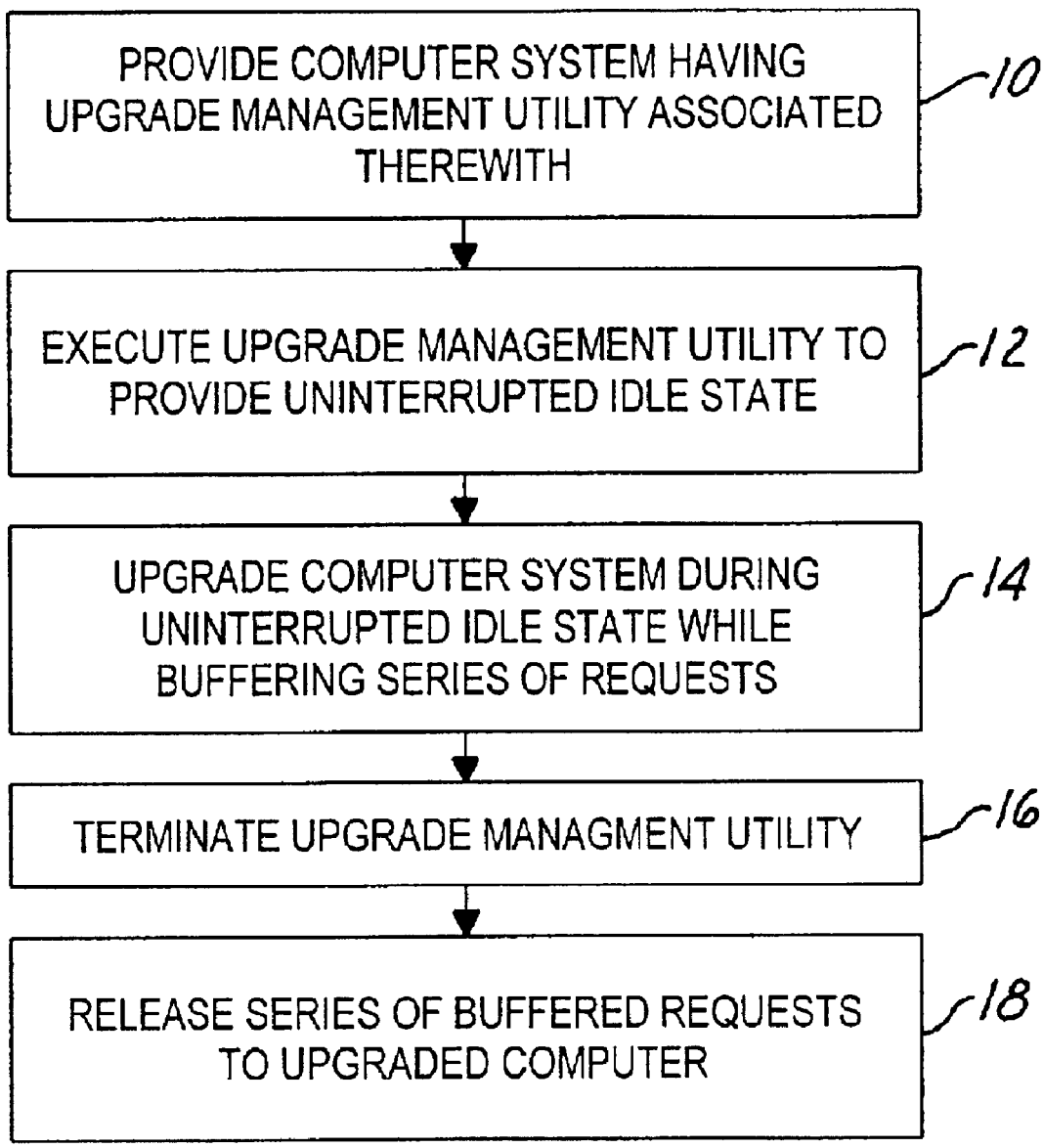
FIG. 1 shows a schematic process flow diagram illustrating a series of progressive process steps in accord with the method of the present invention.

Referring now to FIG. 1, there is shown a schematic process flow diagram illustrating a series of progressive process steps in accord with the method of the present invention.

As is illustrated in FIG. 1, and in accord with the block of text which corresponds with reference numeral 10, there is first provided within the context of the present invention a computer system having associated therewith an upgrade management utility.

Within the preferred embodiment of the present invention with respect to the computer system, the computer system is typically and preferably, although not necessarily exclusively, a computer system whose operation is desired to be minimally disrupted incident to upgrading of components within the computer system. Similarly, typically and preferably, the computer system is a computer system whose operation is generally not desired to be interrupted or disrupted under any circumstances during its operation, and whose operation is generally desired to be continuous. Thus, typically and preferably, but not exclusively, the present invention is more likely to be applicable to more powerful computer systems, such as but not limited to main frame computer systems, mid range computer systems and server computer systems, in comparison with less powerful computer systems, such as but not limited to client computer systems and personal computer systems.

Within the preferred embodiment of the present invention with respect to the upgrade management utility, the upgrade management utility provides for a buffering of a series of incoming requests to the computer system when upgrading the computer system while operating the computer system, to thus provide an uninterrupted idle state when upgrading the computer system when operating the computer system.

As will be discussed in greater detail below, to realize the foregoing object, the upgrade management utility will typically and preferably be initiated by a command, instruction or action of a party who desires to upgrade a particular computer system.

With respect to the association of the upgrade management utility and the computer system, and although it is generally preferable within the present invention that the upgrade management utility be closely associated with or resident within the computer system which is desired to be updated in accord with the present invention, such in general is not required within the present invention. Rather, the upgrade management utility may be provided in a computer system or a server which is adjunct to the computer system which is desired to be upgraded in accord with the present invention.

Referring again to FIG. 1, and in accord with the block of text which corresponds with reference numeral 12, there is shown the next process step in accord with the present invention.

As is illustrated within the block of text which corresponds with reference numeral 12, there is executed the upgrade management utility which is associated with the computer system to provide within the computer system the uninterrupted idle state.

Within the present invention and the preferred embodiment of the present invention, the execution of the upgrade management utility will typically and preferably be provided by either the user of the computer system which is desired to be upgraded, or more typically and preferably, the supplier of an upgrade to the computer system which is desired to be upgraded or a party who is responsible for operation of the computer system which is desired to be upgraded.

Referring again to FIG. 1, and in accord with the block of text which corresponds with reference numeral 14, there is shown the next process step in accord with the present invention.

As is shown within the block of text which corresponds with reference numeral 14, there is upgraded the computer system while operating the computer system within the uninterrupted idle state as provided incident to execution of the upgrade management utility in accord with the block of text which corresponds with reference numeral 12, while simultaneously buffering a series of requests incoming to the computer system. The series of requests incoming to the computer system which have been buffered would have otherwise been forwarded to the computer system if the computer was not operating in the uninterrupted idle state as provided incident to execution of the upgrade management utility in accord with the block of text which corresponds with reference numeral 12.

Within the present invention and the preferred embodiment of the present invention with respect to the upgrade to the computer system, and although within the present invention the computer system may be upgraded within the context of a software upgrade, a firmware upgrade or a hardware upgrade, the present invention is generally intended to be most useful, and most common, within the context of a software upgrade to the computer system.

Within the present invention and the preferred embodiment of the present invention with respect to the buffering of the series of requests incoming to the computer system while the computer system is operating in the uninterrupted idle state, the series of requests incoming to the computer system may be buffered within the computer system itself (but not received for operational execution), buffered within a separate utility within the upgrade management utility, buffered within a buffer entity controlled by the upgrade requester or buffered within a buffer entity controlled by the computer user. Most typically and preferably, the series of incoming buffered requests to the computer system will be buffered in a separate buffer utility associated with the computer system, where the associated buffer utility is enabled simultaneously with execution of the upgrade management utility.

Within the preferred embodiment of the present invention with respect to the uninterrupted idle state, the uninterrupted idle state is necessarily of a duration adequate to upgrade the computer system, but not of a duration such that there is compromised or unnecessarily disrupted any of several functions which the computer system might support.

Referring again to FIG. 1, and in accord with the block of text which corresponds with reference numeral 16, there is shown the next process step in accord with the present invention.

In accord with the block of text which corresponds with reference numeral 16, once having upgraded the computer system while operating within the uninterrupted idle state there is terminated the upgrade management utility.

Within the present invention and the preferred embodiment of the present invention with respect to terminating the upgrade management utility, the upgrade management utility will typically and preferably be self terminating incident to internal detection within the computer system of completion and qualification of the upgrade of the computer system. However, it is also within the context of the present invention that the upgrade management utility may be manually terminated, particularly under circumstances where the upgrade of the computer system may not have been properly executed.

Finally, and referring again to FIG. 1, and in accord with the block of text which corresponds with reference numeral 18, there is shown the last process step in accord with the present invention.

As is illustrated within the block of text which corresponds with reference numeral 18, and after having terminated the upgrade management utility and having returned the computer system from its uninterrupted idle state to its normal operational state, the series of incoming requests buffered during the uninterrupted idle state are released to the upgraded computer for operation within the upgraded computer.

Figure 2:
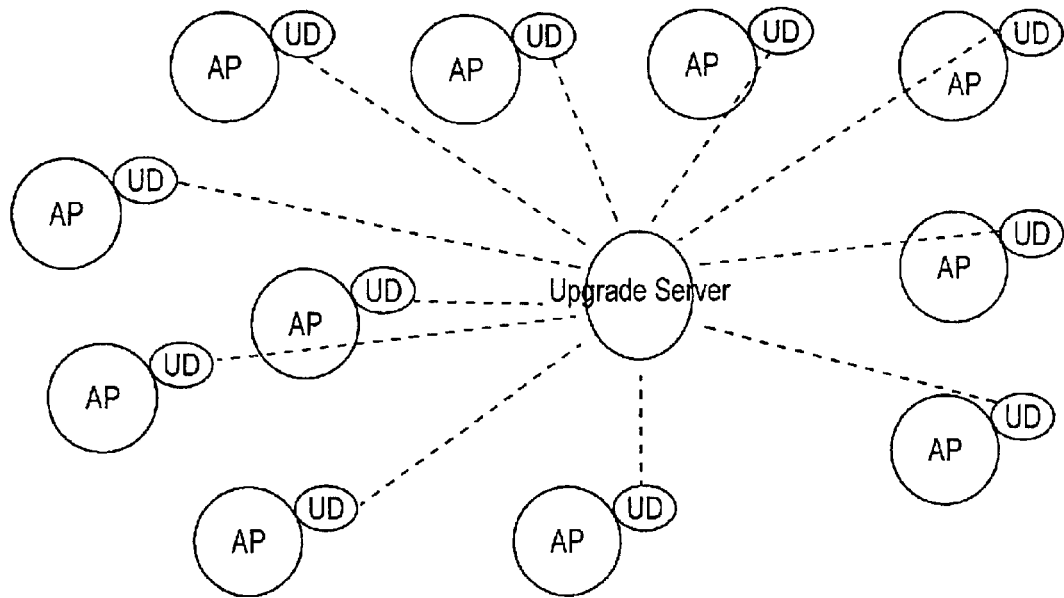
FIG. 2 shows a schematic diagram illustrating a computer system which may be upgraded in accord with the present invention.

Referring now to FIG. 2, there is shown a schematic diagram illustrating a computer system which may be upgraded in accord with the present invention.

Shown in FIG. 2 is a generally centralized upgrade server, designated as Upgrade Server, which simultaneously upgrades a series of computer systems, designated as AP, having associated therewith a series of upgrade management utilities, designated as UD.

As is illustrated within the schematic diagram of FIG. 2, the upgrade server is connected with each of the upgrade management utilities for purposes of effecting and managing an upgrade in software within each of the computer systems, as provided through a network which connects the upgrade server with the series of upgrade management utilities and the series of computer systems. The network may be a hard wired network or a wireless network, but most typically and preferably, within the context of the preferred embodiment of the present invention, the network is employed within a microelectronic fabrication facility for purposes of supporting microelectronic fabrication functions.

Figure 3:
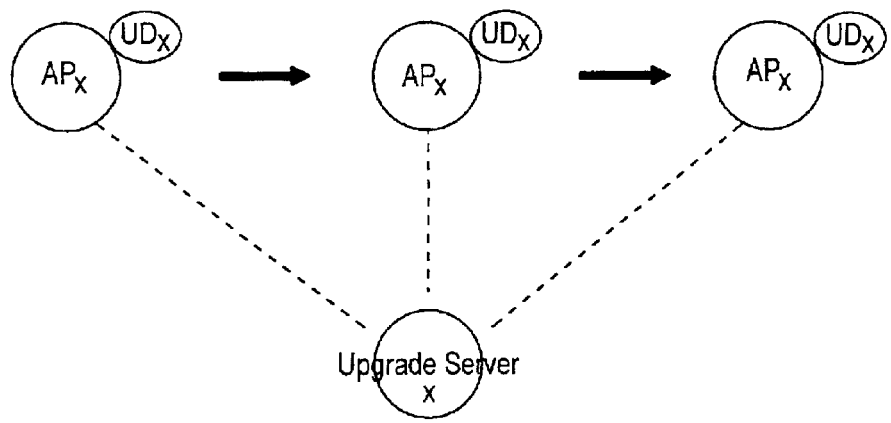
FIG. 3 shows a schematic diagram illustrating an alternative computer system which may be upgraded in accord with the present invention.

Referring now to FIG. 3, there is shown a schematic diagram illustrating an alternative computer system which may be upgraded in accord with the present invention.

As is illustrated within the schematic diagram of FIG. 3, a single computer system APx having associated therewith a single upgrade management utility UDx is sequentially upgraded three times while employing a single upgrade server, designated as Upgrade Server X.

As is understood by a person skilled in the art, while the schematic diagram of FIG. 3 illustrates the upgrade server as having a connection to the computer system rather than the upgrade management utility, such is not necessarily intended to suggest that there necessarily exists a difference in mechanism through which the upgrade server within either FIG. 2 or FIG. 3 operates in order to ultimately upgrade the series of computer systems as illustrated in FIG. 2 or the single computer system as illustrated in FIG. 3.

Within the context of simultaneously upgrading a series of computer systems in accord with FIG. 2 or successively upgrading a single computer system in accord with FIG. 3, the upgrade server will in a first instance have contained therein an upgraded version of a software program which is desired to upgrade an operating version of the software program operating within the series of computer systems as illustrated within FIG. 2 or the single computer system as illustrated within FIG. 3.

To effect the foregoing result, a series of actions, as follows, may be undertaken in accord with the present invention, although other series of actions may also be in accord with the present invention.

First, the upgrade server may send a system upgrade signal to the computer systems operating under an older version of the software program. The system upgrade signal may in turn trigger the computer systems to prepare for a software upgrade by setting a series of upgrade flags and triggering the upgrade management utilities.

Next, after the upgrade management utilities have been started, they may wait for the computer systems operating under the older version of the software program to execute any outstanding requests prior to entering into an uninterrupted idle state. Similarly, incident to setting the upgrade flags, a series of request buffering procedures may be initiated such that incoming requests are buffered during the uninterrupted idle state. In addition to buffering the incoming requests, and depending upon the nature and extent of the computer systems upgrade, there may also be saved a series of image files of the computer systems outputs in addition to buffering the series of incoming requests to the computer systems.

Next, the computer systems operating under the older version of the software program forward to the upgrade management utilities a series of upgrade ready signals and then terminate themselves.

Next, the upgrade management utilities after having received the upgrade ready signals will start the upgraded version of the software within each of the computer systems in an upgrade start mode and then terminate themselves.

Next, the upgraded versions of the software will install and self-test within each of the computer systems since they are being installed and started in the upgrade start mode.

Finally, the upgraded versions of the software will restore any video images which were saved and archived incident to upgrading the computer systems, and request release of the series of buffered incoming requests to the computer systems. Incident to restoration of the video images and release of the buffered incoming images, the series of upgrades is complete.

Upon practicing the invention as disclosed within the Description of the Preferred Embodiment, there is provided by the present invention a method for upgrading a computer system employed within a microelectronic fabrication facility and a system for upgrading the computer system employed within the microelectronic fabrication facility, wherein the computer system is upgraded while minimally disrupting functions which the computer system supports within the microelectronic fabrication facility.

The present invention realizes the foregoing object by employing within the method for upgrading the computer system and the system for upgrading the computer system an upgrade management utility which provides for a buffering of a series of incoming requests to the computer system when upgrading the computer system while operating the computer system, to thus provide an uninterrupted idle state when upgrading the computer system when operating the computer system.

As is understood by a person skilled in the art, the preferred embodiment of the present invention is illustrative of the present invention rather than limiting of the present invention. Revisions and modifications may be made to components and operations through which is provided a method in accord with the preferred embodiment of the present invention and a system in accord with the preferred embodiment of the present invention, while still providing a method in accord with the present invention and a system in accord with the present invention, further in accord with the accompanying claims.

What is claimed is:

1. A method for upgrading a computer system comprising:
   providing a computer system having associated therewith an upgrade management utility, the upgrade management utility providing for a buffering of a series of incoming requests to the computer system when upgrading the computer system while operating the computer system, to thus provide an uninterrupted idle state when upgrading the computer system when operating the computer system;
   executing the upgrade management utility when operating the computer system to effect the uninterrupted idle state;
   upgrading the computer system within the uninterrupted idle state with a firmware upgrade or a hardware upgrade to provide an upgraded computer system while accumulating a series of buffered incoming requests; and
   terminating the upgrade management utility after upgrading the computer system within the uninterrupted idle state and releasing the series of buffered incoming requests for operation within the upgraded computer system.

2. The method of claim 1 wherein the upgrade management utility is resident within the computer system.

3. The method of claim 1 wherein the upgrade management utility is not resident within the computer system.

4. A method for upgrading a computer system comprising:
   providing a computer system operated within a facility selected from the group consisting of chemical fabrication facilities, mechanical fabrication facilities and electrical fabrication facilities, the computer system having associated therewith an upgrade management utility, the upgrade management utility providing for a buffering of a series of incoming requests to the computer system when upgrading the computer system while operating the computer system, to thus provide an uninterrupted idle state when upgrading the computer system when operating the computer system;
   executing the upgrade management utility when operating the computer system to effect the uninterrupted idle state;
   upgrading the computer system within the uninterrupted idle state to provide an upgraded computer system while accumulating a series of buffered incoming request; and terminating the upgrade management utility after upgrading the computer system within the uninterrupted idle state and releasing the series of buffered incoming requests for operation within the upgraded computer system.

5. A method for upgrading a computer system comprising:

providing a computer system operated within a microelectronic fabrication facility, the computer system having associated therewith an upgrade management utility, the upgrade management utility providing for a buffering of a series of incoming requests to the computer system when upgrading the computer system while operating the computer system, to thus provide an uninterrupted idle state when upgrading the computer system when operating the computer system;

executing the upgrade management utility when operating the computer system to effect the uninterrupted idle state;

upgrading the computer system within the uninterrupted idle stale to provide an upgraded computer system while accumulating a series of buffered incoming requests; and terminating the upgrade management utility after upgrading the computer system within the uninterrupted idle state and releasing the series of buffered incoming requests far operation within the upgraded computer system.

6. A system for upgrading a computer system comprising:

a computer system; and an upgrade management utility associated with the computer system, wherein the upgrade management utility provides for a buffering of a series of incoming requests to the computer system when upgrading the computer system with a firmware upgrade or a hardware upgrade while operating the computer system, to thus provide an uninterrupted idle state when upgrading the computer system when operating the computer system.

7. Th system of claim 6 wherein the upgrade management utility is resident within the computer system.

8. The system of claim 6 wherein the upgrade management utility is not resident within the computer system.

9. A system for upgrading a computer system comprising:

a computer system operated within a facility selected from the group consisting of chemical fabrication facilities, mechanical fabrication facilities and electrical fabrication facilities; and an upgrade management utility associated with the computer system, wherein the upgrade management utility provides for a buffering of a series of incoming requests to the computer system when upgrading the computer system while operating the computer system, to thus provide an uninterrupted idle state when upgrading the computer system when operating the computer system.

10. A system for upgrading a computer system comprising:

a computer system operated within a microelectronic fabrication facility; and an upgrade management utility associated with the computer system, wherein the upgrade management utility provides for a buffering of a series of incoming requests to the computer system when upgrading the computer system while operating the computer system, to thus provide an uninterrupted idle state when upgrading the computer system when operating the computer system.

* * * * *